(12) United States Patent
Bao et al.

(10) Patent No.: US 7,578,176 B2
(45) Date of Patent: Aug. 25, 2009

(54) SYSTEMS AND METHODS FOR UTILIZING SCANNING PROBE SHAPE CHARACTERIZATION

(75) Inventors: Tianming Bao, Frisco, TX (US); Hao-Chih Liu, Goleta, CA (US); Gregory A. Dahlen, Santa Barbara, CA (US); Rohit Jain, Ventura, CA (US)

(73) Assignee: Veeco Metrology, Inc., Santa Barbara, CA (US)

( * ) Notice: Subject to any disclaimer, the term of this patent is extended or adjusted under 35 U.S.C. 154(b) by 0 days.

(21) Appl. No.: 11/645,092

(22) Filed: Dec. 22, 2006

(65) Prior Publication Data

US 2008/0154521 A1   Jun. 26, 2008

(51) Int. Cl.
*G01N 13/10* (2006.01)
*G12B 21/02* (2006.01)

(52) U.S. Cl. .......................... 73/105; 73/1.89; 702/34; 702/104; 977/878; 977/881

(58) Field of Classification Search .................. 73/105, 73/1.89; 702/34, 104, 168; 977/878, 881
See application file for complete search history.

(56) References Cited

U.S. PATENT DOCUMENTS

| | | | |
|---|---|---|---|
| 4,724,318 A | 2/1988 | Binnig | |
| RE33,387 E | 10/1990 | Binnig | |
| 5,266,801 A | 11/1993 | Elings et al. | |
| RE34,489 E | 12/1993 | Hansma et al. | |
| 5,412,980 A | 5/1995 | Elings et al. | |
| 5,414,260 A * | 5/1995 | Takimoto et al. | 250/306 |
| 6,354,133 B1 | 3/2002 | Yedur et al. | |
| 6,539,642 B1 * | 4/2003 | Moriyasu et al. | 33/551 |
| 6,591,658 B1 | 7/2003 | Yedur et al. | |
| 6,810,354 B1 | 10/2004 | Dahlen | |
| 6,881,954 B1 * | 4/2005 | Morimoto et al. | 73/105 X |
| 7,001,785 B1 | 2/2006 | Chen | |
| 7,055,378 B2 | 6/2006 | Su et al. | |
| 7,257,753 B2 * | 8/2007 | Sato | 714/738 |
| 7,286,247 B2 * | 10/2007 | Archie et al. | 356/625 |
| 7,360,405 B2 * | 4/2008 | Salapaka et al. | 73/105 |

(Continued)

FOREIGN PATENT DOCUMENTS

JP   2001033373 A  *  2/2001

OTHER PUBLICATIONS

Villarrubia, J.S., "Algorithms for Scanned Probe Microscope Image Simulation, Surface Reconstruction, and Tip Estimation", Journal of Research of the National Institute of Standards and Technology. vol. 102, No. 4, Jul.-Aug. 1997. pp. 425-454.

(Continued)

*Primary Examiner*—Thomas P Noland
(74) *Attorney, Agent, or Firm*—Patterson, Thunte, Skaar & Christensen, P.A.

(57) ABSTRACT

A scanning probe microscope's probe tip dimensions as they exist or existed for a certain data or measurement are inferred based on probe activity taking place since a probe characterization procedure was performed. The inferred probe tip dimensions can be used to correct nanoscale measurements taken by the probe to account for changes in the probe's geometry such as wear.

36 Claims, 14 Drawing Sheets

U.S. PATENT DOCUMENTS

2006/0097162 A1* 5/2006 Maruyama et al. .......... 250/309
2006/0113472 A1* 6/2006 Shigeno et al. ............. 250/310

OTHER PUBLICATIONS

Martin et al, "Method for imaging sidewalls by atomic force microscopy", IBM Research Division. T.J Watson Research Center, New York. Appl. Phys. Lett. vol. 64, No. 19, May 9, 2004. pp. 2498 to 2500.

KLOS et al., "Experiments in mask metrology using a CD AFM" IBM Corporation, Florida. Peak XV Networks, California. In Metrology, Inspection and Process Control of Microlithography XIV. Vol. pp. 350-360, (even numbered pages only provided), dated 2000.

Liu, et al., "Carbon Nanotube AFM Probes for Microlithography Process Control", SPIE Paper No. 6152-115, Veeco Instruments, Inc. California, 11 pages. by May 2008.

Martin, et al., "Toward acute metrology with scanning force microscopes" IBM J. Research Center, New York. J.Vac.Sci. Technol. B13(6) Nov./Dec. 1995. pp. 2335-2339.

Liu, et al., "Advanced atromic force microscopy probes: Wear resistant designs" Veeco Instruments, Inc., California. J. Vac. Sci. Technol. B. 23 (6). Nov./Dec. 2005 pp. 1-4.

Bao, et al., "Advanced CD AFM metrology for 3D critical shape and dimension control of photomask etch processing" Veeco Instruments, Inc. California. MP Mask Technology Center, LLC. Idaho. Proc. Of SPIE vol. 6349 63493Z-1 to 6349z-10. Nov. 2006.

* cited by examiner

SYSTEMS AND METHODS FOR UTILIZING SCANNING PROBE SHAPE CHARACTERIZATION

FIELD OF THE INVENTION

The present invention relates generally to scanning probe microscopy and, more particularly, to accounting for probe characteristics that change over the life of the probe.

BACKGROUND OF THE INVENTION

Several known probe-based instruments monitor the interaction between a cantilever-based probe and a sample to obtain information concerning one or more characteristics of the sample. For example, scanning probe microscopes (SPMs), such as the atomic force microscope (AFM), are devices which typically use a sharp tip and low forces to characterize the surface of a sample down to nanoscale dimensions. The term nanoscale as used for purposes of this invention refers to dimensions smaller than one micrometer. SPMs monitor the interaction between the sample and the probe tip. By providing relative scanning movement between the tip and the sample, surface characteristic data can be acquired over a particular site on the sample, and a corresponding map of the site can be generated. Because of their resolution and versatility, SPMs are important measurement devices in many diverse fields ranging from semiconductor manufacturing to biological research.

The probe of a typical SPM includes a very small cantilever which is fixed to a support at its base and which has a sharp probe tip extending from the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as strain gauges, capacitance sensors, etc. The probe is scanned over a surface using a high resolution three axis scanner acting on the sample support and/or the probe, or a combination of both. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,226,801; and Elings et al. U.S. Pat. No. 5,412,980.

Different SPM probe tip shapes are used for a variety of applications. One type of tip shape that is commonly used for measuring the height of certain nanoscale features, for testing material properties (e.g. elastic modulus), or for manipulating very small objects is a pointed shape (e.g. parabolic) having a relatively simple profile. To image or measure surface features such as vertical sidewalls and undercut regions, and to take critical dimension (CD) measurements, SPMs utilize more complex probe tip shapes, such as boot-shaped or inverted mushroom-shaped probe tips, some of which may have one or more protrusions along the scanning direction.

SPMs may be designed to operate in a variety of modes, including modes for measuring, imaging, or otherwise inspecting a surface, and modes for measuring nanomechanical properties of a sample. Modes for inspecting a sample include contact mode and oscillating mode. In contact mode operation, the microscope typically scans the tip across the surface of the sample while keeping the force of the tip on the surface of the sample generally constant. This effect is accomplished by moving either the sample or the probe assembly generally perpendicular to the surface of the sample in response to sensed deflection of the cantilever as the probe is scanned horizontally across the surface. In this way, the data associated with this vertical motion can be stored and then used to construct an image of the inspected sample's surface, or to make certain measurements of selected surface features. Some SPMs can at least selectively operate in an oscillation mode of operation, in which the tip is oscillated at or near a resonant frequency of the cantilever of the probe. The amplitude or phase of this oscillation is affected by the tip-sample interaction, and any changes in the oscillation are sensed. These sensed changes are then monitored, stored, and processed into data that characterizes the sample. The collected data, in turn, may be plotted to image the sample surface, or analyzed to produce metrology data of certain dimensions of a feature on the sample's surface (such as, for example, a height of the feature). In applications for measuring nanomechanical properties of a sample, the probe is used to apply a mechanical stimulus to a sample, and monitor the resulting mechanical response of the sample. From this type of testing, material properties such as elastic or dynamic modulus may be measured. U.S. Pat. No. 7,055,378 describes nanomechanical applications for SPMs and associated techniques.

Notwithstanding the high resolution and accuracy capability of SPMs, the ultimate resolution of the data obtained by such probe-based instruments is limited by the physical characteristics of the tip of the probe itself. More particularly, there are limitations as to how small, and sharp, the tip can be made. For surface inspection applications, the tip shape is reflected in the acquired data, a problem that is exacerbated by the fact that SPMs often image very small (e.g., Angstrom scale) features. As a result, an error in the acquired data results and the corresponding accuracy of the surface image is significantly compromised. Similarly, for nanomechanical property measurement applications, the shape of the probe tip, i.e., its sharpness, substantially affects the force-deformation relationship.

For some applications, small variations in probe shape may be negligible. However, for many present-day applications, a high degree of accuracy and precision is required to resolve the features of interest on the sample surface, such that the tip shape variations must be accounted for. For instance, in the semiconductor fabrication industry, imaging features such as lines, trenches and vias with sub-nanometer accuracy and high precision is desired. These features may have dimensions in the range of tens of nanometers, and are continually getting smaller. With typical tip widths in the same size range, the shape of the probe tip introduces significant error in the data, which must then be corrected to accurately image the sample surface. The aforementioned challenges are further aggravated in situations where complex sample surface topography require a commensurate increase in tip shape complexity (and size) to image such surfaces.

Various reconstruction techniques are known for providing a correction based on characterizing the shape of the tip. Once the tip shape is measured or estimated, the variations in data measurements caused by the tip shape can then be "eroded" from the raw SPM sample image, for example, via mathematical morphology, thus yielding an improved "corrected" image. This is typically accomplished by removing or eroding the area (2-D; volume for 3-D) of the estimated probe tip shape for each position the probe tip occupies in the scan. In another known and widely used technique, a simple subtraction of the tip-width in the scan direction can provide improved reconstructed images and critical dimension measurements. Various known morphological techniques are described, for example, in J. S. Villarrubia, Algorithms for Scanned Probe Microscope Image Simulation, Surface Reconstruction, and Tip Estimation, J. Res. Natl. Inst. Stand. Technol. 102, 425 (1997). Other techniques that account for the probe tip's interaction point with the sample surface for more accurate correction of measurements are described, for example, in U.S. Pat. No. 6,810,354.

In order for these techniques to provide an accurate correction, the dimensions of the CD tip must be determined with high accuracy. The way in which this is typically accomplished is by scanning a tip characterizer structure or set of structures that have well-known dimensions with the probe tip. Characterizer structures include, for example, a silicon nanoedge, a nanostructure having a width reference structure, or a cavity-type structure having acute angled corners at its entrance. Because the dimensions of the characterizer structure are known or at least very closely approximated, various dimensions of the probe tip can be obtained during a probe tip characterization procedure. In a typical probe tip characterization procedure, the probe is scanned over the characterizer of known dimensions to produce an image data profile that includes distortion introduced by the shape of the probe tip. The image data profile is then analyzed to identify the tip distortion and to generate a probe tip correction factor based thereupon, which is applied to correct the raw measurements of actual samples.

Probe tip wear is another challenge that is becoming of greater concern as SPM applications continue to demand greater resolution. Probe wear occurs when probe tips interact with the samples in the course of conducting measurements. Material can be lost from, or picked up by, the probe tips, causing changes in the size and shape of the tips. Different types of probes (in terms of shape or materials) have different wear characteristics, and even probes of the same type can wear differently for a variety of reasons. Indeed, the same probe can experience different wear trends depending on the nature of the samples being scanned by the probe, the corresponding diverse types of interaction between the probe tip and the samples, and other changing circumstances.

A standard technique for dealing with the issue of probe wear requires that the probe tip be re-characterized over the course of measuring samples as described above. The process of characterization is time consuming, requiring removing the probe tip from the sample being measured and aligning the probe with a characterizer, then running a characterization routine to scan the characterizer structure. Sometimes, such as for critical dimension probe tips, more than one characterizer structure is needed to characterize all of the necessary probe tip dimensions. The probe is then re-aligned with the sample for further measurement. The re-characterization procedure can take up to 10 minutes or more, which is extremely costly in terms of capacity for high volume manufacturing applications such as semiconductor fabrication. The time and frequency required for performing tip characterization can significantly affect the cost of ownership of the instrument, and the cost and speed measurements per wafer. Thus, probe wear presents a throughput problem in addition to measurement performance-related problems. Moreover, the occurrence of probe wear creates a design trade-off between measurement performance and throughput in which applying known techniques to improve measurement performance compromises throughput, and vice versa.

Known techniques for managing probe wear based solely on probe re-characterization measurements are becoming impracticable as any additional process bottlenecks present substantial costs for SPM operators, particularly in high volume production processes. In view of these and other related challenges concerning probe tip wear, a solution is needed for improving nanoscale measurement performance and throughput.

SUMMARY OF THE INVENTION

One aspect of the invention is directed to inferring probe tip dimensions of a scanning probe microscope as those dimensions existed for a certain data or measurement obtained in connection with SPM techniques involving a sample and/or probe. The inference is made based on probe activity taking place since a probe characterization procedure was performed. The inferred probe tip dimensions can be used to correct nanoscale measurements taken by the probe to account for changes in the geometry and dimensions of the probe tip caused by wear, for example. Inferring probe wear as a function of probe activity can substantially maintain the ultimate accuracy of the SPM measurements and critical dimension metrology during intervals between probe characterization procedures. Additionally, the improved accuracy can permit probe characterizations to be performed less frequently while substantially maintaining the SPM measurement performance, thereby improving SPM throughput in a throughput-sensitive environment such as a high volume manufacturing or production process.

A system for correcting scanning probe microscopy measurements to account for nanoscale changes in probe geometry according to one aspect of the invention comprises a probe change trend identification engine that includes a processor operably coupled with at least one storage medium that contains at least one executable instructions. The instructions, when executed, cause the probe change trend identification engine to obtain information about the probe, including probe activity history; estimate a probe wear trend as a function of probe activity based at least in part on the received information; and generate a correction function to be applied to a scanning probe microscopy measurement. Application of the correction function produces a corrected measurement that accounts for a changed probe geometry that existed at the time the scanning probe microscopy measurement was made.

Another system according to one aspect of the invention comprises a processor operatively coupled with at least one storage medium that contains at least a database that includes probe change trend information for at least one type of probe, and instructions executable by the processor. When executed, the instructions cause the system to estimate a probe shape attribute of a first probe based at least in part on the probe change trend information.

Another aspect of the invention is directed to inspecting a nanostructure sample using a scanning probe that experiences probe wear as a function of use. A first characterization of the probe is performed, and data is obtained from the sample using the probe. Corrected measurements of the nanostructure are produced based on the data, and probe wear is accounted for as a function of the probe use that occurs after the first characterization of the probe and before any subsequent characterization of the probe.

A method for making nanoscale measurements using a scanning probe according to another aspect of the invention includes the steps of performing a plurality of probe characterizations, substantially automatically analyzing the plurality of scanning probe characterizations to infer a trend associated with at least one tip shape attribute of the scanning probe, using the scanning probe to obtain data from a sample, and utilizing the data and the trend to compute a nanoscale measurement of the sample.

According to another aspect of the invention, a nanostructure sample is inspected using a scanning probe. Nanoscale characterization of the scanning probe is performed. Data from the scanning probe is obtained, and the probe activity required to obtain the data is tracked. Optionally, a shape attribute of the scanning probe can be estimated based on at least the nanoscale characterization of the scanning probe and any trend associated with the scanning probe activity. An output is generated that represents a geometry of the nanostructure sample that is based on at least the SPM data of the nanostructure sample and, optionally, on the estimated shape attribute of the scanning probe.

Conducting nanoscale inspection of a sample using a scanning probe according to another aspect of the invention includes performing at least two characterizations of the scanning probe that are separated by an interval that includes obtaining data from a plurality of points on the sample. At least one estimated characteristic of the scanning probe is utilized to generate corrected representations of the data such that accuracy of the inspection is substantially maintained for the plurality of points on the sample.

Another method for conducting inspection of a nanostructure sample using a scanning probe according to one aspect of the invention includes performing first and second probe characterizations separated by an interval of obtaining data from the sample using the scanning probe. Using the scanning probe causes wear of the probe such that a shape attribute of the probe is different immediately after the first probe characterization than immediately before the second probe characterization by an amount greater than a desired measurement accuracy of the inspection. The desired measurement accuracy of the inspection is substantially maintained for the interval without performing any further probe characterization.

In another aspect of the invention, a representation of a sample is reconstructed to account for wear of a probe tip used for obtaining nanoscale measurements of the sample. A first and a second characterization of the probe tip is performed. Using the probe tip, measurements for a plurality of sites on the sample are obtained in between the first and the second characterization of the probe tip. For each of the plurality of sites, at least one inferred shape attribute of the probe tip is created based on the first and the second characterizations of the probe tip; and at least one of the measurements associated with that site is corrected based on the at least one inferred shape attribute of the probe tip to account for wear of the probe tip.

Another aspect of the invention is directed to inspecting a nanostructure sample in a production testing application. Characterization of the probe is performed, and data is obtained from the sample at a plurality of sites using the scanning probe to produce, for each site, at least one critical dimension measurement representative of that site. The inspecting is achieved such that a ratio of time spent obtaining data in relation to the time spent obtaining data and characterizing the probe is greater than 50%. Alternatively, or additionally, the inspection is achieved at a rate of over 25 sites per hour.

BRIEF DESCRIPTION OF THE DRAWINGS

The invention may be more completely understood in consideration of the following detailed description of various embodiments of the invention in connection with the accompanying drawings, in which.

Figure 1:
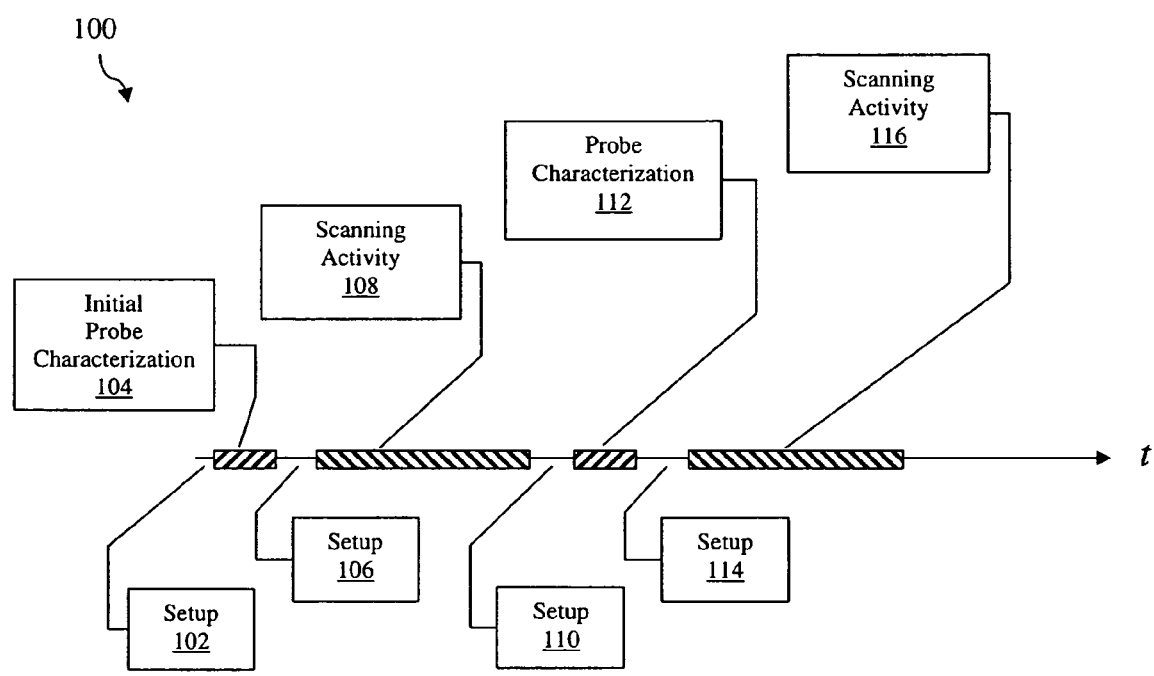
FIG. 1 illustrates one example of a typical operating regime for a scanning probe microscope (SPM), in which periods of probe characterizations and periods of scanning activity are plotted along a timeline.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

Figure 4:
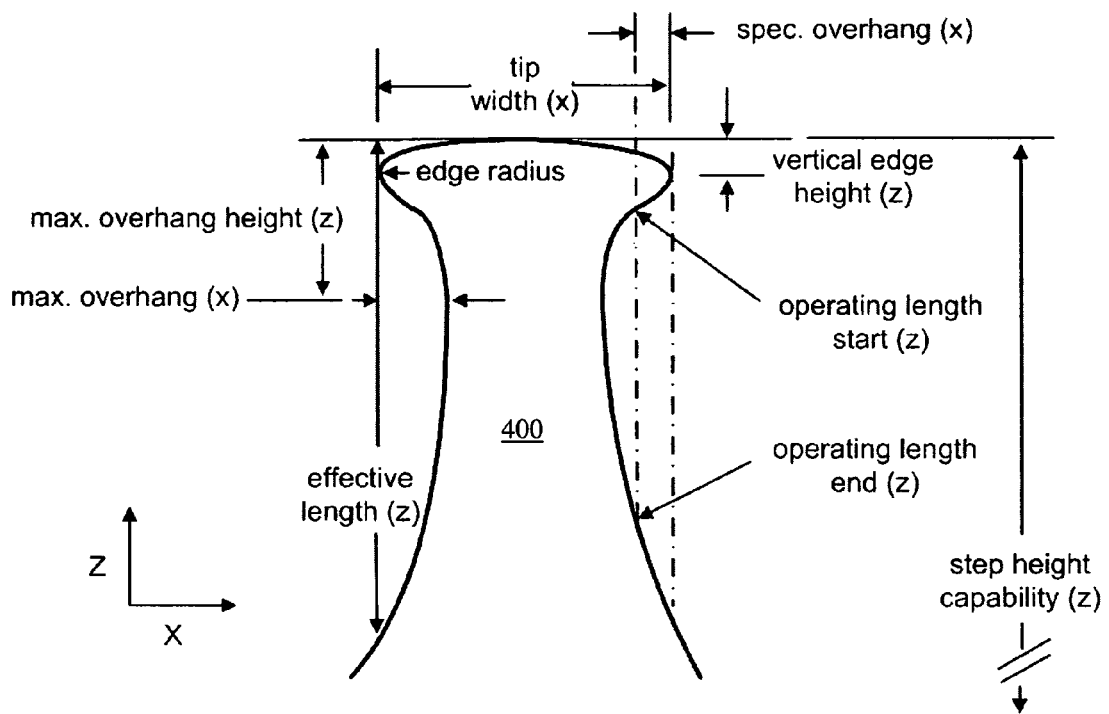
FIG. 4 illustrates an exemplary set of tip shape parameters of a critical dimension (CD) probe.

FIG. 1 illustrates one example of a typical operating regime 100 for an SPM, in which periods of probe characterizations and periods of scanning activity are plotted along timeline t. At step 102, the SPM sets up to conduct initial probe characterization 104. The probe is positioned to scan one or more characterizer structures to assess the probe's dimensions of interest. At step 104, the probe characterization is performed, and the data produced from the characterization is stored. The probe characterization step results in the measurement of one or more shape attributes of the probe. Some examples of shape attributes include, but are not limited to: tip radius, tip width, vertical edge height, overhang, effective length, and others. Several of these tip shape attributes are shown in FIG. 4. Tip shape attributes comprise any measurements of probe geometry that can have a potential impact on measured data of a sample.

At step 106, the probe is positioned relative to the sample to be scanned. The sample can be any suitable surface that is suitable for inspection via SPM. For example, various types of samples can include metallurgical samples, semiconductor devices, storage devices such as disk drive platters, polymer samples, biological structures, microelectromechanical system (MEMS) structures, nanostructures, and the like. A site is typically a contiguous area on the sample that is inspected by the SPM. The size of a site is typically governed by the desired measurement resolution, scanning or measuring speed and available range of the SPM instrument, and by time constraints. Whereas a sample can have an area on the order of hundreds of square centimeters, the area of a site is typically on the order of one to many microns. A sample is typically inspected at multiple sites. For example, in semiconductor fabrication, 10 or more different sites can be selected at various points on the wafer as a statistical sample set representing the overall wafer. At each site, an SPM typically takes certain measurements or scans the surface of the sample (thereby taking a sequence of measurements) in a raster line fashion according to known techniques such as those described above.

At step 108, the sample is scanned and data are obtained. The most common form of SPM data comprises a topographic image that is representative of the structure on the sample surface. The data may instead be a single or multiple scan profiles instead of a full image. In addition, the data can also include electrical or magnetic profiling of the sample, measurements of cantilever amplitude, deflection, frequency, phase, tunneling current, conductivity, optical properties, compositional maps, or any other measurement enabled by SPM techniques. Metrology measurements such as critical dimension (CD) measurement, nanomechanical measurements such as measurements to obtain surface elasticity information about the sample, and any other type of scanning probe activity that involves interaction between the scanning probe and some material (of the sample or of some other structure) can also be performed. For example, scanning activity 108 can take place at a single scanning site on the sample, or may include data obtained at multiple sites (involving re-positioning the probe from one site to the next). At each site, the scanning may include a single or multiple readings at a single point or a single CD measurement, or may include taking a multiplicity of readings, such as in a multi-line surface profile scan, or a plurality of CD measurements.

At step 110, the probe is disengaged from the sample and is again aligned with the tip characterizer structure(s). At step 112, the probe tip is characterized to assess the extent of change resulting from the preceding scanning activity of step 108. At step 114, the probe is aligned with the sample for further scanning activity. Setup step 114 may involve positioning the probe at a new site on the sample to be read, or may involve returning the probe to a site at which scanning activity took place earlier in step 108. Further scanning activity 116 is then carried out.

Figure 2:
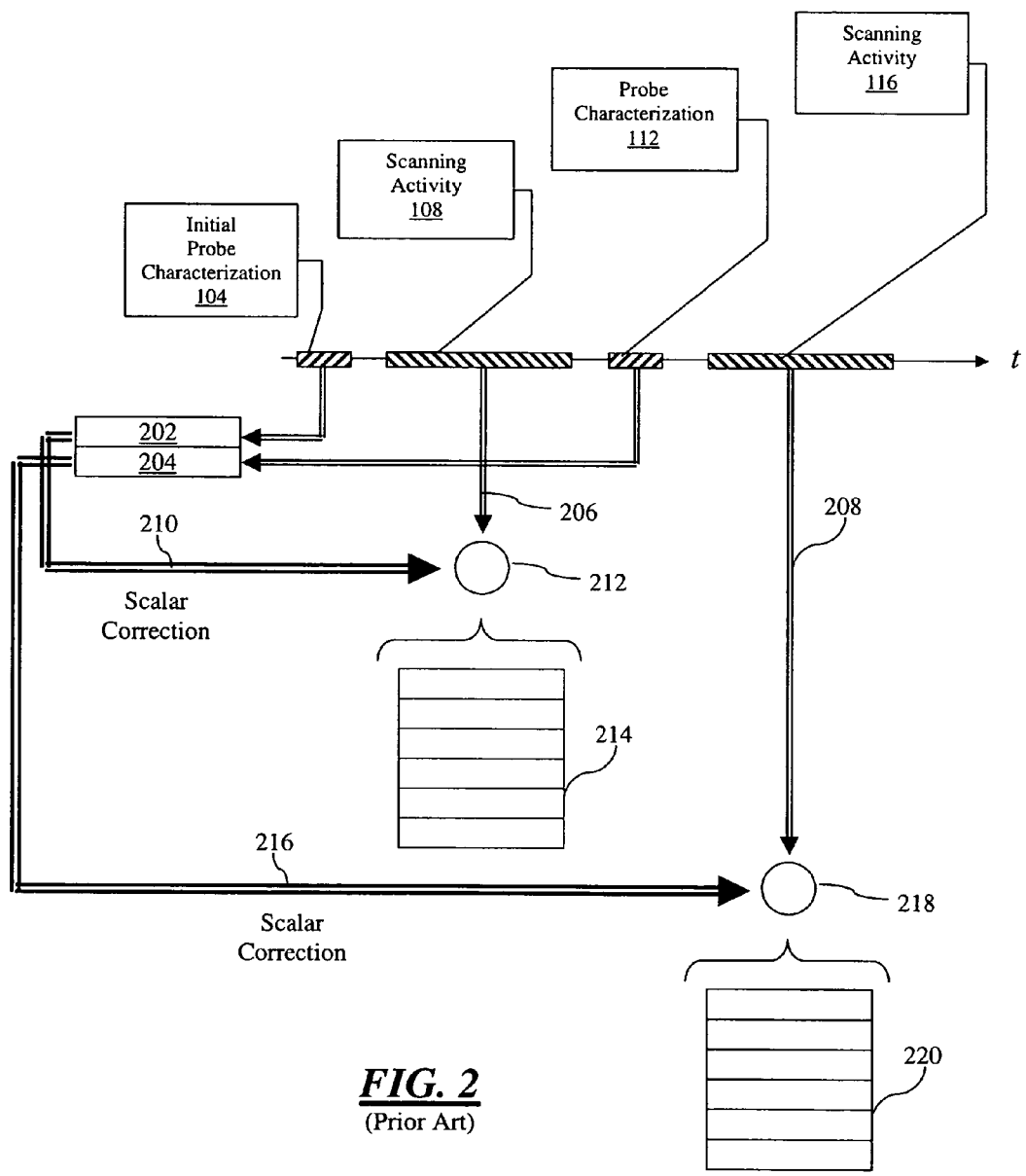
FIG. 2 illustrates an example of a conventional approach for correcting SPM measurements for probe wear in a stepwise fashion, in which each step corresponds to the actual measured probe changes obtained by probe characterization.
Figure 3A:
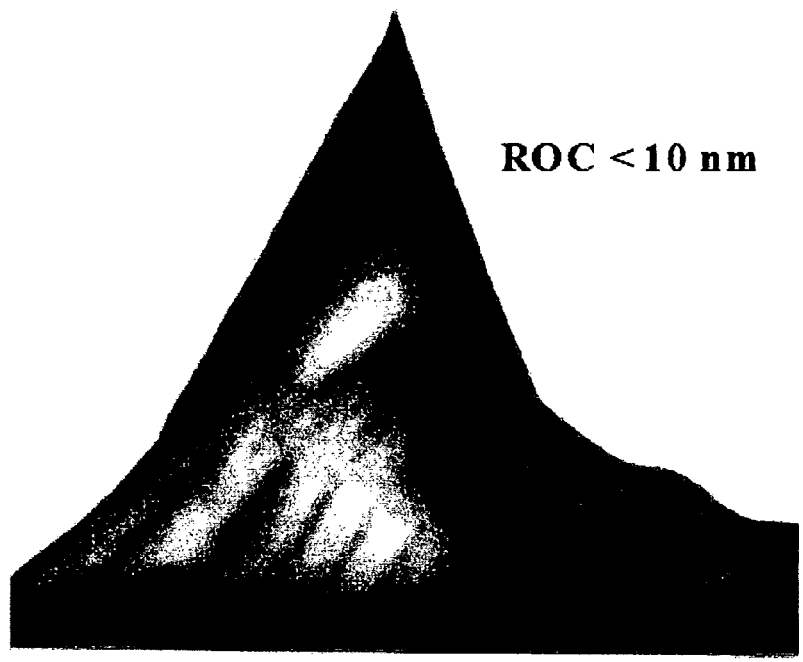
FIGS. 3A-3D are diagrams illustrating a range of various types of probe tip shapes for use with scanning probe microscopes in conjunction with aspects of the invention.
Figure 3B:
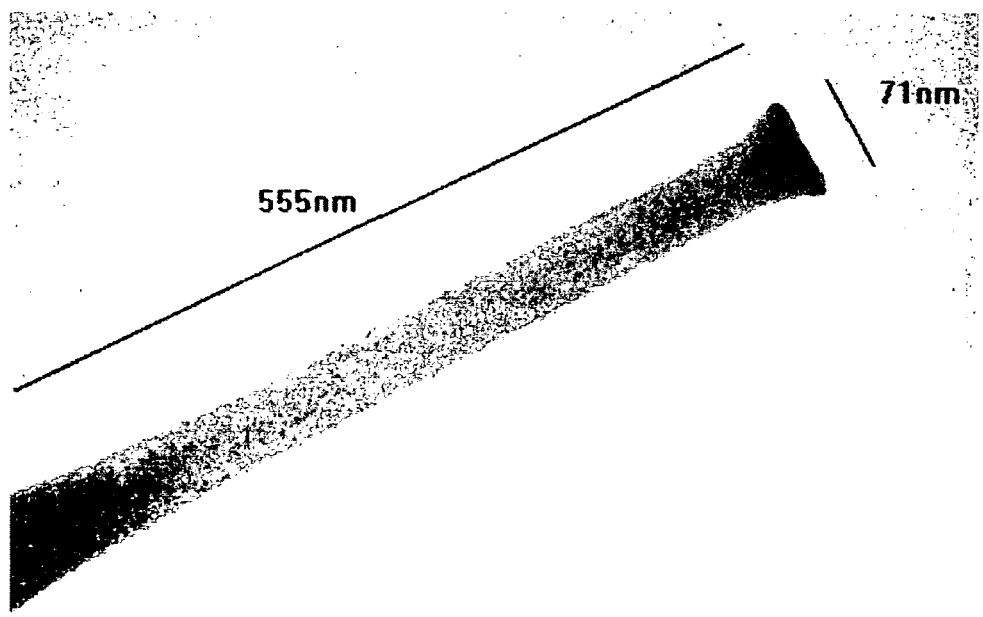
Figure 3C:
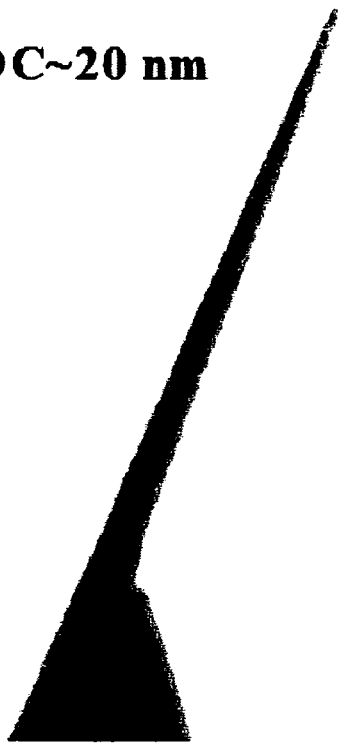
Figure 3D:

Conventionally, as described above, the SPM data are adjusted for probe wear in a step-wise fashion, in which each step corresponds to the actual measured probe changes obtained in probe characterization steps 104 and 112. FIG. 2 illustrates one such conventional approach, as applied to the data obtained by operating regime 100. Initial probe characterization 104 produces probe profile data 202, whereas probe characterization 112 produces probe profile data 204. Scanning activity 108 produces a set of data 206, and scanning activity 116 produces data set 208. Data sets 206 and 208 contain raw data that does not account for the shape of the probe. Probe profile data 202 is applied as scalar correction 210 to uniformly correct all of data set 206, and probe profile data 204 is applied as scalar correction 216 to uniformly correct all of data set 208. Scalar corrections 210 and 216 are applied respectively via mathematical functions 212 and 218 to produce corrected measurements 214 and 220 that take the probe geometry into account. Mathematical functions 212 and 218 apply a suitable reconstruction technique such as, for example, any of the reconstruction techniques described in U.S. Pat. No. 6,810,354, including morphological erosion, shape "deconvolution" or the like, simple subtraction, point of tip contact-based correction, and other known methods. For example, see Villarrubia, J. S., Algorithms for Scanned Probe Microscope Image Simulation, Surface Reconstruction, and Tip Estimation, 102 J. Res. Natl. Inst. Stand. Technol., 425 (1997).

Unfortunately, the scalar correction method of FIG. 2 does not take into account changes occurring in the probe during the periods of scanning activity 108 and 116. Thus, corrected data that were originally taken towards the end of the respective period of scanning activity are less accurate than the data taken towards the start of the scanning period.

Embodiments of the present invention that substantially address this problem and other important problems are detailed below. First, however, a brief discussion of SPM probes and various probe wear characteristics is presented. FIGS. 3A-3D depict various known types of scanning probe microscope (SPM) probe tips. The probe shape illustrated in FIG. 3A has a pyramidal shape that is typically utilized in tapping mode atomic force microscopy (AFM). The probe of FIG. 3B has a reentrant tip of a type commonly used in critical dimension (CD) metrology. The probe tip depicted in FIG. 3C has a long, tilt-compensated, conical tip, which may be produced by microfabrication techniques such as focused ion beam (FIB) milling. The probe illustrated in FIG. 3D has a generally cylindrical tip with a rounded end.

The various SPM probes may be fabricated from one or more different materials. Materials such as silicon, silicon nitride, silicon oxide, and tungsten carbide have been used as tips or coatings for tips. As described above, different combinations of tip shape and material will produce probe tips having different wear characteristics. In addition, the range of materials and surface characteristics of the samples being scanned can wear down the probe tips at different rates.

When characterizing an SPM probe tip, the tip geometry can be represented in a variety of ways. For example, a probe tip surface can be modeled spatially in two or three dimensions as points on a coordinate system, as a set of finite elements, as a 2D or 3D image, or the like. Another type of representation of a probe tip is by a set of dimensional parameters that define the probe shape. FIG. 4 illustrates an exemplary parametric representation of a CD probe 400. In the parameter-based model, the overall boot-shape of CD probe 400 is assumed. The various parameters numerically define the boot shape more precisely. Certain parameter-based models presently in use can have 17 or more distinct parameters.

Figure 5A:
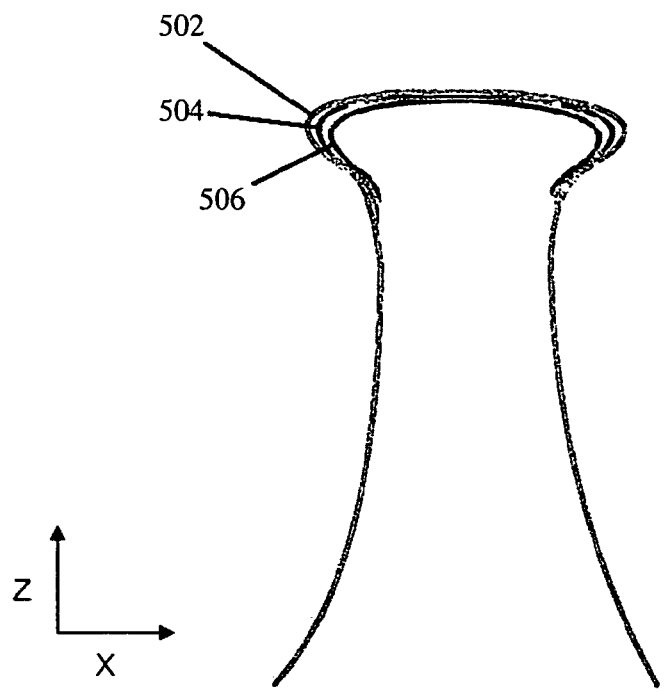
FIGS. 5A-5B illustrate examples of probe tip wear for two different types of tip geometries.
Figure 5B:
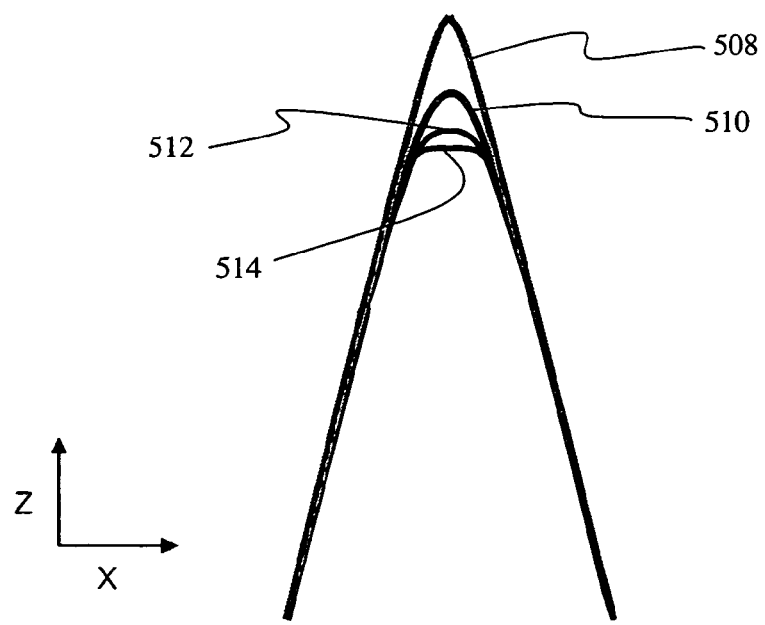

FIGS. 5A and 5B illustrate wear patterns for different probe geometries. Referring to FIG. 5A, a CD probe tip is shown in two dimensions having an initial surface 502. After some wearing of the tip, the surface shape takes the form as indicated at 504. Further wear results in the surface indicated at 506. Note that the wear pattern is such that certain tip parameters wear substantially more than others. For example, in terms of the CD tip parameters defined in FIG. 4, the tip width of the probe depicted in FIG. 5A wears more than the vertical edge height. This wear pattern is based on the tip shape and on how the tip is made to interact with the sample during scanning. As is typical in CD applications, the probe tip of FIG. 5A experiences stronger probe-sample interaction per unit surface area at the side surface of the boot (that faces along a scanning direction, for example) than at the bottom surface (that faces along the z axis). This is due in part to the sharper radius of the boot overhang portion of the probe tip, and in part due to the nature of CD feature width measurements in which vertical surfaces of the sample are measured or profiled.

FIG. 5B illustrates a typical wear pattern for a conical-shaped probe tip. As the probe tip of FIG. 5B is used mainly for data feature height (along the Z axis), the wear tends to occur along the Z axis. The original shape is indicated at 508. Continuing tip wear produces the shapes depicted at 510, 512, and 514, for example. Initially, the amount of wear in terms of tip length along the Z axis is greater (i.e. the difference between original tip shape 508 and first wear amount 510). As the tip wears and becomes duller, the force experienced by the tip is typically distributed over a greater area (i.e. the force per unit area decreases), resulting in a generally reduced rate of wear.

Figure 6A:
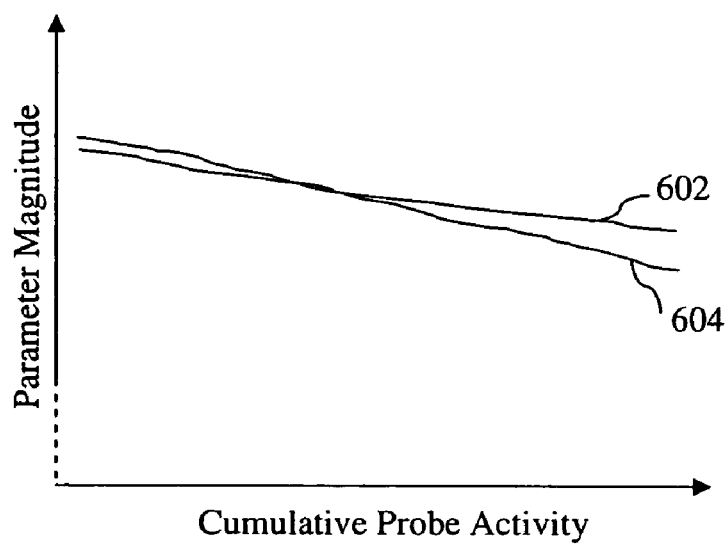
FIGS. 6A-6B are charts showing examples of probe tip wear vs. probe activity for certain tip shape parameters of different probe tips.
Figure 6B:
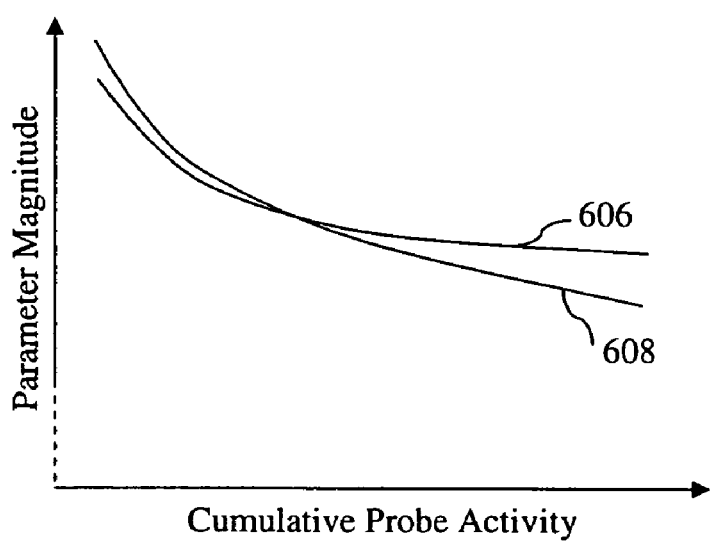

FIGS. 6A and 6B each plots a tip shape parameter dimension against cumulative probe activity to illustrate various types of probe tip wear trends. FIG. 6A illustrates a tip shape parameter having a tendency to wear generally linearly as a function of probe activity. Curve pairs 602 and 604 in FIG. 6A, and 606 and 608 in FIG. 6B represent different wear rates for a common parameter of two probe tips of the same shape. Probe activity can be defined in various ways within the spirit of the invention. The simplest definition, for example, would be the number or sites scanned or the total measurement time. More sophisticated definitions of probe activity can include, without limitation, the number of scan lines, scanned distance, a measure of roughness of surface features scanned, probe-sample interaction forces, and the like. More sophisticated probe activity estimates may also combine multiple considerations and provide different weighting factors, for example, for scans at higher speed and/or higher force. Cumulative probe activity is the total amount of this activity that a probe has experienced through its measurement lifetime.

Curves 602 and 606 are each an example of a probe tip wearing at a relatively slower rate as compared with the rate of wear of the probe tips represented by curves 604 and 608. As described above, the difference in wear profile between each pair of curves of FIGS. 6A versus 6B can be due to the geometry of the tip feature that is at least partially represented by the respective parameter. Thus, the curves of FIG. 6A can represent a different type of probe tip than the one represented by the curves of FIG. 6B. Additionally, the curves of FIG. 6A and 6B can represent different parameters of the same type of probe tip.

The difference in tip wear rate between the curves of each pair (i.e., between curve 602 and 604; and between curves 606 and 608) may be due to a difference in material from which the probe tips are made. The different wear rates may also be explained by differences in material present on the surface of each sample (e.g., silicon vs. metal vs. oxides). Additionally, the different wear rates can be the result of different surface features being read. For example, in CD measurement, scanning a site with taller lines or deeper trenches would require more interaction by the overhang portion of the CD tip with the sample.

One aspect of the invention is directed to accounting for probe tip wear to improve measurement accuracy without sacrificing production throughput. In this aspect, a SPM estimates or infers its probe tip's changed dimensions as they exist or existed for a certain data or measurement, without actually having to perform a probe characterization procedure immediately preceding the data or measurement. The conventional operating process flow discussed above with reference to FIG. 2 would require frequent tip characterization procedures to produce accurate profile scans or measurements, and accept some degree of inaccuracy (presumed to be negligible) for the scanned points or measurements taken after some scanning activity has occurred following a tip characterization. In contrast, this aspect of the invention applies additional information known about the probe tip to estimate or infer how, and to what extent, the tip changed (due to wear, for example) since the last probe tip characterization procedure had been performed.

This type of approach produces substantial improvements in accuracy compared with conventional techniques. For example, this approach can provide a reduction in measurement error that would otherwise be manifested in an interval of probe activity due to probe wear occurring from the beginning to the end of the interval. The amount of substantial improvement for any particular instance will depend on the type of probe tip, the type of sample material, and the type of measurement technique being employed. Substantial improvements in measurement accuracy may be realized from 20% to 75% or greater depending on the conditions.

Similarly, the time between performing probe characterizations can be substantially increased (i.e., by a factor of 20% to 100% or more), while still maintaining the same measurement accuracy (e.g., ±1 nm) as in the conventional approach having more frequent probe characterizing. In one example embodiment in which tip wear is relatively high (e.g., >0.5 nm per site), tip characterization needs to be performed for every site according to conventional methods. Tip characterization can take about 3 minutes; and the time to perform actual scanning or measuring of a site can take about 1.5 minutes. For a sample in which 10 sites are to be scanned, the total time under the conventional technique for scanning and tip characterizing would be about 30+15=45 minutes.

By applying, techniques according to aspects of the present invention, tip characterization frequency may be reduced to every 5 to 10 or more sites. Thus, for measuring 10 sites, in one embodiment, only two tip characterizations are performed (one before, and the other after conducting the data collection from the sample). In this case, the time for performing the two tip characterization would be 6 minutes. The total time for tip characterization and measurement would thus be expected to take 6+15=21 minutes. This is an improvement in throughput by about a factor of 2, or 100%. An improvement of this magnitude has a substantial impact on the cost per measurement and the payback time for an investment in an SPM for industrial metrology. Also, note that in embodiments where tip characterization is performed both before and after each set of site measurements, the sample measurement ratio generally increases as the number of sites to be measured per sample increases. This is because the number of characterizations per group of consecutive sites measured between characterizations approaches 1.

As one measure of one type of improvement provided by aspects of the invention, a sample measurement ratio is herein defined as the ratio of time that an AFM is used to inspect a sample of interest to the total time spent inspecting and performing tip characterization. In the example above, conventionally, it was necessary to characterize the probe tip between every site, with 30 minutes going to tip characterization and 15 minutes for sample measurements. This represents a sample measurement ratio of 15/(15+30)=0.33, or 33%. In the second example, applying aspects of the invention, the sample measurement ratio was increased to 15/21=0.71, or 71%. Embodiments of the present invention have been applied to measure polysilicon etch samples at 9 sites (at 1.5 minutes each) for every 1 tip characterization (at 3 minutes each). This represents a sample measurement ratio as high as 13.5/(13.5+3)=0.82. These results achieved better than 1 nm accuracy on average.

The scanning technique may be modified within the spirit of the invention to achieve higher measurement ratios, for example, using fewer measurement lines for the tip characterization step (say 1.5 minutes total time for tip characterization). Under these conditions, a sample measurement ratio of 13.5/(13.5+1.5)=0.9 can be achieved. Note also, the tip wear of the probe can be interpolated over a larger number of measurement sites between characterizations, to further increase the measurement ratio. For example, setting a measurement recipe to characterize the tip every 20 sites at 1.5 minutes per site and tip characterization can achieve a measurement ratio of (20×1.5)/(20×1.5+1×1.5)=0.95.

In practice, it is possible to push the sample measurement ratio arbitrarily close to 1.0 accepting potential compromises in the accuracy of the tip characterization and/or the interpolation of the tip wear trend. Recognizing the trade-off between measurement process throughput and confidence in measured results, operators of SPMs may elect to operate measurement recipes at different sample measurement ratios, whether more aggressive, or more conservative, to achieve the measurement and throughput performance required for their various applications.

Figure 7:
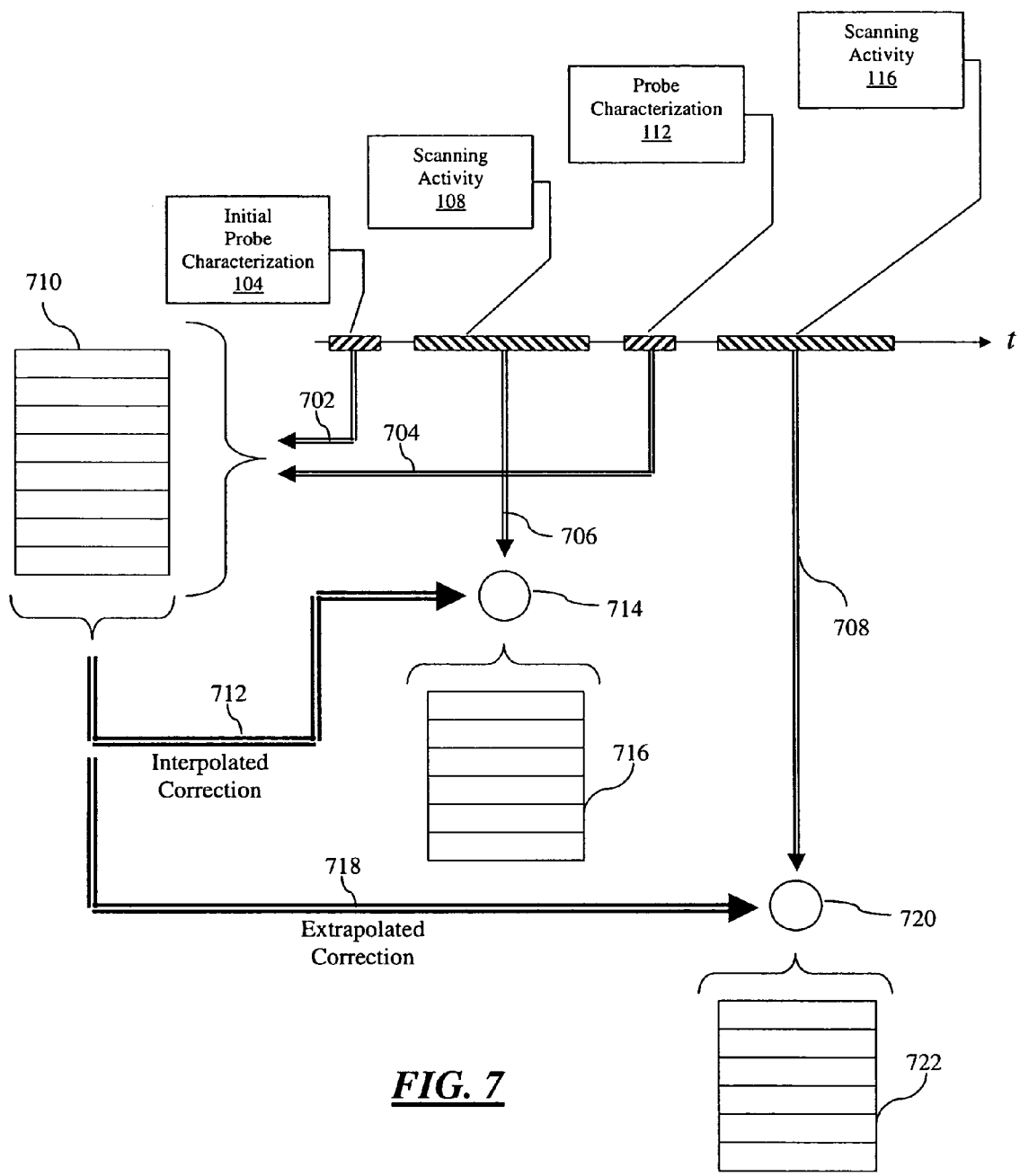
FIG. 7 is a process flow diagram illustrating an example embodiment in which data obtained from multiple probe characterization procedures is combined and analyzed to produce a probe wear trend as a function of probe activity according to one embodiment of the invention.

FIG. 7 is a process flow diagram illustrating an example embodiment in which data obtained from multiple probe characterization procedures is combined and analyzed to produce a probe wear trend as a function of probe activity. Based on at least one of the probe characterizations and on scanning activity taking place close in time to the at least one probe characterization, changes in the shape of the probe tip that occur during the scanning activity are inferred. From these inferred changes, the microscopy data produced in the scanning activity can be more accurately corrected or adjusted to account for the probe changes occurring during the scanning.

Initial probe characterization process 104 produces probe characterization data 702. Subsequent probe characterization process 112 produces probe characterization data 704. Scanning activity 108 and 116 respectively produce data sets 706 and 708, which are either raw (i.e., dilated) data, or data that has been corrected to some degree to account for a nominal probe shape that was known or determined solely from a probe characterization procedure.

Probe characterization data 702 and 704 are combined to generate probe wear trend 710. In one embodiment, probe wear trend 710 is a piecewise-linear representation of the actual wear trend of the probe. In a related embodiment, probe wear trend is a set of coefficients for a mathematical function (e.g., polynomial, exponential, or the like) that represents the wear trend of the probe.

Probe wear trend 710 is used to apply interpolated correction 712 to data of data set 706 via mathematical function 714 to produce adjusted or corrected data 716. Interpolated correction 712 can be a simple linear interpolation, or can be an application of a more complex nonlinear mathematical curve or piecewise function representing changes in probe shape occurring between probe characterization procedures 104 and 112, as a function of time or of probe activity. For example, three or more tip characterizations can be used to perform a polynomial or logarithmic curve fitting. The type of function to use for curve fitting can be selected on a tip parameter-by-parameter basis according to predetermined wear trends such as the ones described above with reference to FIGS. 5A-5B and 6A-6B.

In a related embodiment, probe wear trend 110 is used to extrapolate changes in probe activity occurring after probe characterization 112 without the benefit of a subsequent probe characterization. As exemplified in FIG. 7, extrapolated correction 718 based on probe wear trend 710 is applied to correct data 708 via mathematical function 720 to produce adjusted or corrected data 722. For extrapolating, probe wear trend 710 can be projected forward (or backward) as a function of probe activity based on the trend characteristic known from initial probe characterization 104 and probe characterization 112. As with the interpolated probe wear correction 712, extrapolated correction 718 can be linear or non-linear.

As described in greater detail below, interpolated correction 712 or extrapolated correction 718 can be applied as part of the data reconstruction, or can be applied as a separate data processing operation for adjusting only the measurements for inferred or estimated probe wear occurring during periods of scanning activity. In the latter case, it should be understood that the image or measurement data reconstruction can be applied before or after the adjustment for inferred probe wear.

Figure 8:
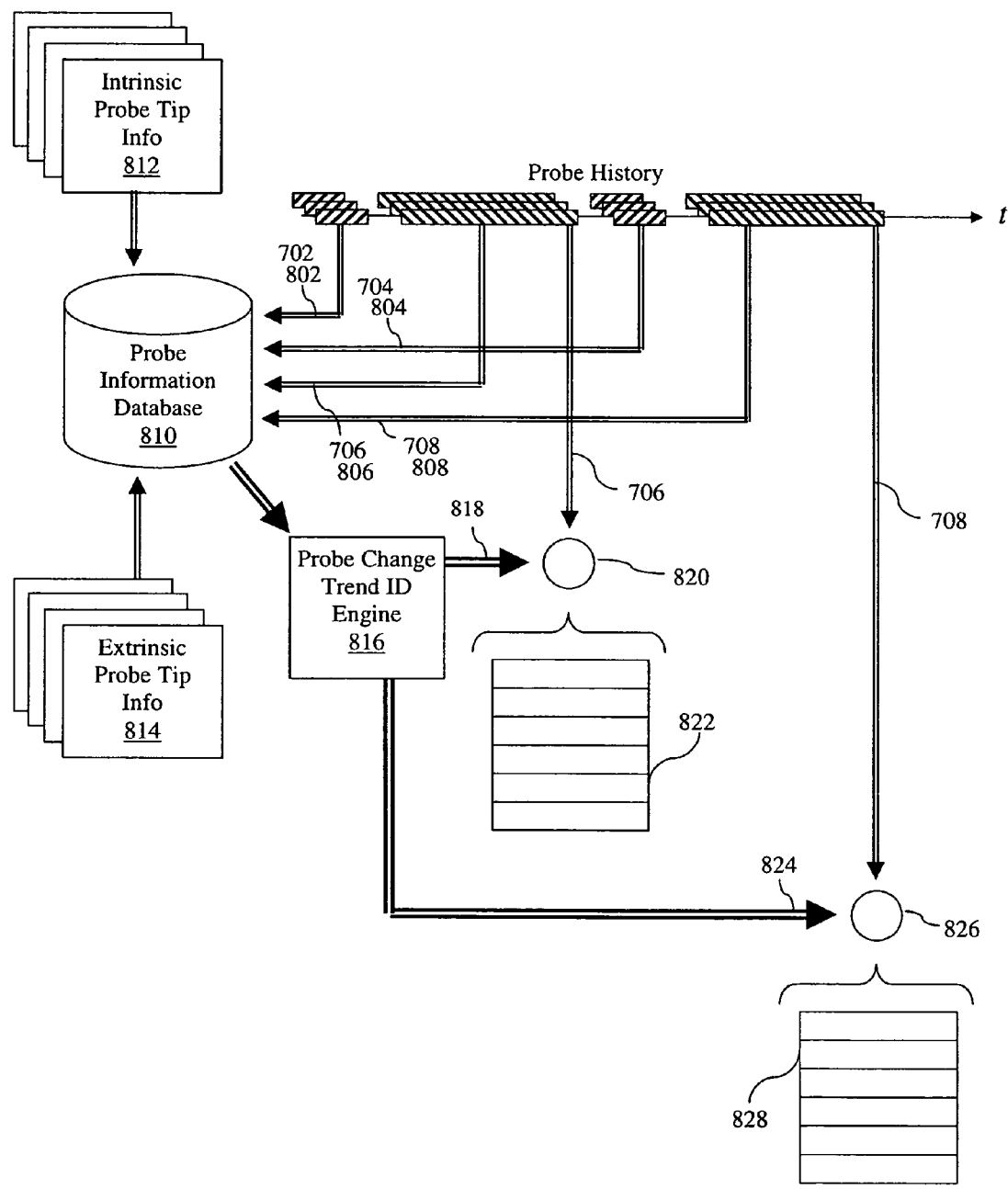
FIG. 8 illustrates an example process flow diagram of a system that considers different categories of information for determining or estimating a wear trend for a probe according to another type of embodiment.

In other embodiments of the invention, various items of information related to the probe are used in addition to probe characterizations to infer probe wear. FIG. 8 illustrates an example process flow diagram of a system that considers different categories of information for determining or estimating a wear trend for a probe. The embodiments depicted in FIG. 8 exemplify utilizing certain combinations of information items; it should be noted, however, that a variety of different combinations of information items may be suitable, and all variants, combinations, and sub-combinations are within the scope and spirit of the invention.

As depicted in FIG. 8, the current data, indicated at 706 and 708, is to be corrected for probe wear. Similarly to the embodiments of FIG. 7, probe characterization data 702 and 704 preceding SPM data sets 706 and 708, respectively, are utilized for determining the wear trend of the probe. In one embodiment, historic probe characterization data, such as data 802 and 804 taken over the life of the probe (including probe characterization data obtained in connection with data one or more different samples) are also used for computing the wear trend of the probe. In a related embodiment, historic data 806 and 808 taken by the probe during previous scanning activity are used in conjunction with current data 706 and 708 for computing the probe wear trend. Together, these data sets represent the cumulative probe activity experienced by the probe. This data can be used to determine the actual amount of probe activity against which the wear trend is applied.

In one example embodiment, time, or some other measure of probe activity can be tracked or analyzed individually for different portions of, or locations on the probe. For example, an SPM can keep track of the extent of probe-sample interaction for the left side and for the right side of the boot-shaped protrusions of a CD tip. The probe activity can thus be mapped onto the probe tip, and used to estimate individual wear amounts for the corresponding portions of the probe tip.

In another type of embodiment, the shapes of the surface features encountered by the probe are analyzed to indicate the amount of probe-sample interaction experienced by the different surfaces of the probe tip. For example, the surface scans can be analyzed to reveal the ratio of measurement time spent by a CD probe inside undercut trenches, as compared to the measurement time spent measuring or characterizing top corners of surface protrusions. The former would normally be expected to cause more wear on the top surfaces of the boot-shaped protrusions of a CD tip, whereas the latter would most likely cause wear on the lower surfaces of the CD tip. In a further embodiment, the SPM samples or tracks the interaction force between the probe tip and sample surface during scanning, and logs this information. The interaction force data can be mapped to the cumulative probe activity or as a function of time. If the degree of probe-sample interaction is not uniform over any scanning period, this information can be used to further correct the wear trend.

As depicted in FIG. 8, the probe history information is stored in probe information database 810. According to one embodiment, probe information database 810 can be maintained by a computer system that includes a processor interfaced with storage media containing instructions executable by the processor, and data to be stored. The computer system can be associated with the SPM, or can exist separately therefrom. Probe information database 810 can store intrinsic information 812 and extrinsic information 814 about the probe tip. Intrinsic probe tip information 812 includes items such as, for example, a type identifier of the probe tip (such as a model number), materials from which the probe tip is constructed, and other relevant facts about the particular probe tip. Extrinsic probe tip information 814 includes items related to generally the probe tip type, such as parameter definitions and their nominal values, and known wear trends of the probe tip type as a function of probe activity, wear trends for different combinations of probe-sample materials, and for different measurement types. Probe information database 810 can be maintained for a single SPM, a group of related SPMs, all SPMs used by a given plant or customer, or some or all SPMs and/or probe tips provided by a given manufacturer.

Probe change trend identification engine 816 accesses the probe information database 810, estimates the probe wear trend as a function of probe activity, and produces correction functions 818 and 824 to be applied respectively to data sets 706 and 708 via mathematical functions 820 and 826. In one embodiment, probe change trend identification engine 816 is implemented using one or more computer systems (including at least one processor communicatively interfaced with data storage media, such as probe information database 810 and a medium containing instructions executable by the processor. The instructions are programmed to cause probe change trend identification engine 816 to access records in database 810, and use information contained in those records to estimate the probe wear and make the corrections to produce SPM metrology data. Application of the corrections produces corrected data 822 and 828 that accounts for the probe wear.

In one embodiment, probe change trend identification engine 816 is programmed to access selected types of probe information maintained in database 810. Alternatively, probe change trend identification engine 810 dynamically selects an appropriate combination of information items from database 810 based on a set of decision-making criteria that are pre-configured in probe change trend ID engine 816. For example, selection of certain information items can be based on the amount of probe wear already present (recognizing that the tip will wear slower as certain tip features become dull), or based on the types of surface features encountered by the tip or on the types of material present on the surface of the sample.

According to a related embodiment, probe change trend identification engine 816 compares different combinations of probe information data for computing the same probe wear trend curve. This redundant technique of applying diverse and potentially overlapping function domains can be useful for cross checking the validity of a probe wear inference or for further refining the probe tip wear approximation to improve accuracy. For example, tip shape parameter corrections can be computed based on multiple different types or combinations of probe information items, and are then compared. Thus, a probe shape parameter value along piecewise linear interpolation between actual probe characterizations may be compared against corresponding value along a polynomial curve fit according to historical characterization data of the probe and to generally known wear trends associated with the probe type. A significant discrepancy between these two estimations may be indicative of an error in data gathering or in a critical defect in the sample, either of which provides useful information upon which decisions can be based to modify the SPM process, for example.

In the event of such discrepancy, a third estimation may be applied to further identify possible causes of the error, or as a tie-breaker. For example, assuming a probe wear correction value computed by linear interpolation between adjacent probe characterizations does not substantially match the correction value computed by curve fitting, the probe-sample interaction forces logged during the scanning activity of interest may be analyzed to further estimate the nature of probe tip wear occurring and resolve the mismatch. Alternatively, other techniques for accounting for errors in data gathering may be employed such as the use of interval arithmetic to perform the calculations.

In a related embodiment, cross-checking is used to detect step changes in the probe wear that may not be a result of ordinary wear. A typical cause of such step change is contamination of the probe tip in which a particle adheres to the tip, resulting in measurement distortion. As an example, a particular wear trend for a certain probe shape parameter may be computed based on numerous probe characterizations, and a curve may be best fit to the points of actual parameter measurement according to known wear characteristics for the parameter of tips of the same type. The curve may not pass through every point. The distance of each measured parameter value from the curve is then compared against a predetermined threshold. If any probe characterization produces a parameter value that is different from the corresponding value of the curve by a margin that exceeds the threshold, a step change may be suspected.

In one example embodiment, probe change trend identification engine 816 computes wear trend curves for different probe parameters based on a diverse set of probe information. For example, a wear trend for a first parameter can be computed from at least one set of probe characterization data in combination with a wear trend associated with the probe type. The wear trend for a second parameter can be computed from probe characterization information in combination with scanned sample feature geometry and further combined with known general wear trends for the probe type.

In another example embodiment, probe change trend identification engine 816 generates a virtual probe tip, which is a multi-dimensional model of the probe tip. In one embodiment, a four-dimensional model is used in which the three-dimensional shape of the probe tip is represented as a function of temporal probe activity, which is the fourth dimension. In a simpler embodiment, a 3-dimensional model is used to represent the probe tip in two dimensions and as a function of temporal probe activity. Morphological erosion or other suitable reconstruction method is performed based on the multi-dimensional virtual probe tip.

In a related embodiment, the virtual probe tip is utilized for generating more accurate adjustments at a limited number of points located at certain intervals of probe activity between actual probe characterizations. This approach may be useful in situations where use of the virtual probe tip is desired, but is computationally costly due to the complexity of the multi-dimensional modeling and morphology. Parametric probe wear correction techniques such as those described above may be used for adjusting the data to account for probe changes occurring during the intervals between applications of the virtual probe tip corrections and actual tip characterizations.

As stated above, the correction or measurement adjustment to account for the probe wear may be applied in various ways. For example, the probe wear correction can be applied as part of morphological erosion computation for reconstructing the image, or as a separate adjustment before or after the morphological erosion computation. The probe wear correction can be applied to correct images made by the SPM (in which case an entire probe surface or a large number of parameters such as tip width, vertical edge height, effective length, and the like, would be considered). Alternatively, the probe wear correction can be applied to correct individual metrology measurements (in which case one parameter or a small number of parameters would considered).

Based on the range of definitions of probe activity discussed above, the granularity of adjustment for probe wear can be quite diverse. For example, in a relatively coarse granularity of probe wear correction, a new inferred correction amount can be applied for each site on the sample. In finer granularity embodiments, a new correction amount can be applied for each scan line within each sample site, or even for every individual metrology measurement or point on a topographic image. In a related embodiment, the level of granularity can be dynamically adjusted by probe change trend ID engine 816 based on a predetermined criterion. For example, new correction amounts can be applied more frequently for newer probes (i.e. having sharper tips or protrusions), and less frequently as the probe is used for scanning (and, presumably, the tip becomes dull and the rate of wear slows).

In one type of embodiment, probe change trend identification engine 816 operates substantially automatically, i.e., without significant human involvement. According to one example embodiment, probe change trend identification engine 816 operates according to a program that requires no operator involvement whatsoever. In another related embodiment, probe change trend identification engine 816 has pre-programmed routines that run automatically, but that require some nominal operator involvement. For example, an operator may need to initiate a routine or sub-routine of probe change trend identification engine 816. In another example, a subroutine of probe change trend identification engine 816 may prompt an operator to provide a certain input by way of entry or selection using an operator interface.

Examples of inputs can include specifying information about the probe or the sample, selecting the algorithm by which the probe will be modeled, selecting certain parameters to be used in computing the probe trend, and the like. Even with some amount human involvement, probe change trend identification engine 816 can be regarded as operating substantially automatically since its operation automates the analytic steps needed to infer the probe wear based on a variety of different information sources feeding into probe information database 810. Therefore, the term "substantially automatically" refers to any of approach that at least partially automates a series of steps.

Figure 9A:
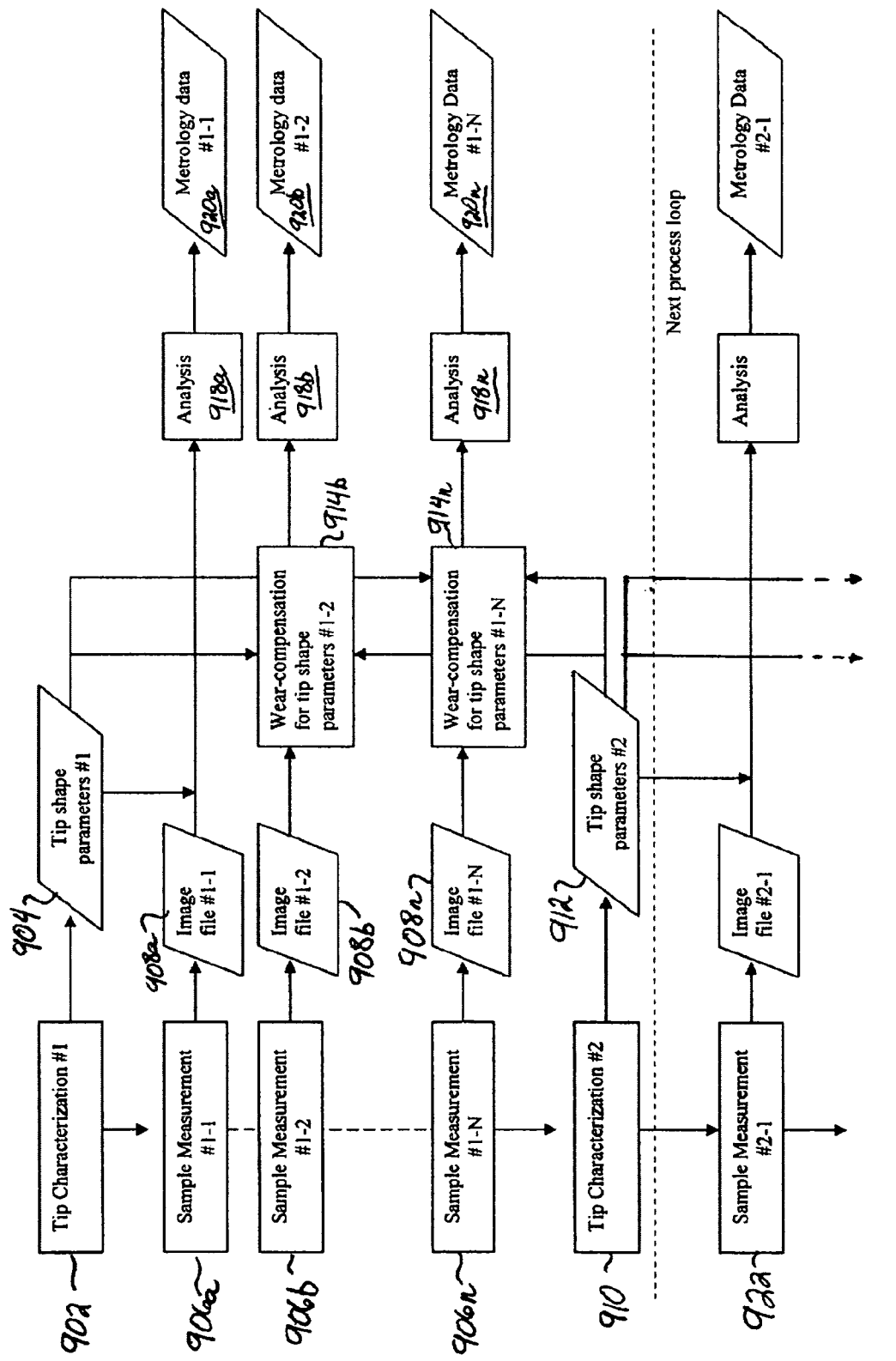
FIGS. 9A-9D are process flow diagrams illustrating various example embodiments for coordinating tip wear compensation according to aspects of the invention with other process steps for producing corrected metrology data.

FIGS. 9A-9D are process flow diagrams illustrating various example embodiments for coordinating tip wear compensation according to aspects of the invention with other process steps for producing corrected metrology data. The selected embodiments shown and discussed with reference to FIGS. 9A-9D are illustrative of certain types of variations that can be made to the embodiments, and are by no means exhaustive of extent of variations and embodiments that are possible within the spirit and scope of the invention. FIG. 9A illustrates application of the inferred probe wear correction to produce more accurate metrology data. At step 902, a first tip characterization is performed to produce tip shape parameter values 904. At steps 906a-906n (collectively, steps 906), the probe is used to take measurements of a sample. In one sense, each of steps 906 can be regarded as one unit of probe activity. Each of steps 906 produces a corresponding image data file 908a-908n, such as representing a 2D or 3D topographic image of the sample measurements. At step 910, a subsequent tip characterization is performed to produce tip shape parameter values 912.

At steps 914b-914n, tip shape parameter values 904 and 912 are used to generate and apply suitable wear compensation for each of image files 908b-908n. In the embodiment depicted, the probe wear is inferred through a suitable interpolation or curve fitting procedure for each image file 908b-908n. Image file 908a is analyzed together with the tip shape parameters 904 at step 918a to generate metrology data set 920a. At steps 918b-918n, the image files 908b-908n are analyzed together with the products of the wear compensation steps 914b-914n to produce corresponding metrology data sets 920b-920n. In various embodiments, metrology data sets 920a-920n can each represent a variety of metrology information. For example, each metrology data set can represent the coordinates of a measured point of the sample's surface, a plurality of such points (such as the points obtained from a raster scan line), or a CD measurement such as line width or corner radius.

Tip shape parameters 912 can be used for a subsequent process loop beginning with sample measurement 922. As described above with reference to FIG. 8, in a related embodiment, probe wear compensation steps 914b-914n would utilize additional tip shape parameters (not shown) for additional input to the curve fitting algorithm for inferring the amount of probe wear corresponding to each sample measurement 906b-906n.

Figure 9B:
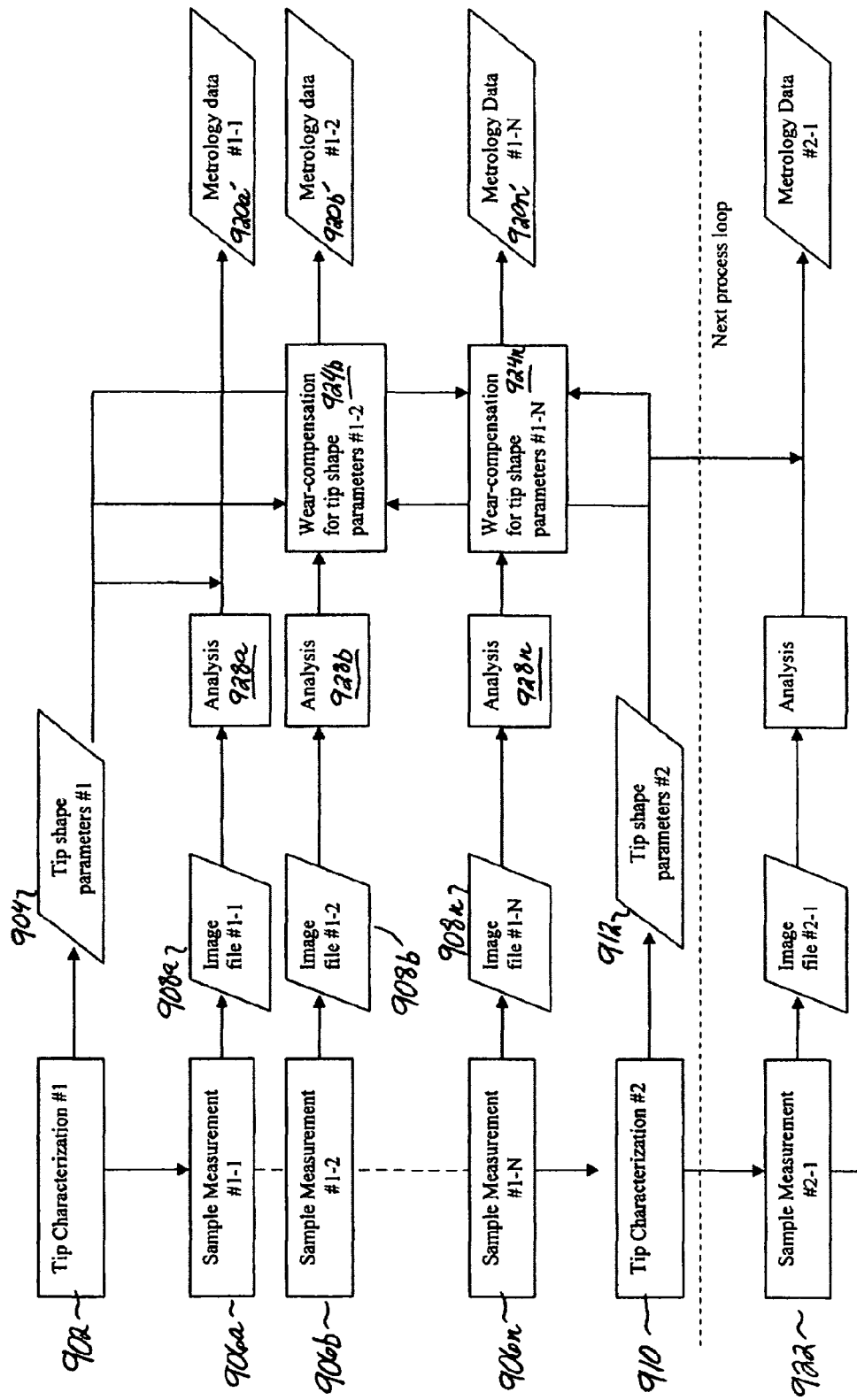

FIG. 9B illustrates a process that is a variation of the process of FIG. 9A. In the process of FIG. 9B, Analysis steps 928a-928n are generally equivalent to analysis steps 918a-918n of FIG. 9A. However, in the process of FIG. 9B, analysis steps 928b-928n are performed prior to wear compensation steps 924b-924n. This variation produces metrology data sets 920a'-920n', which are generally equivalent to respective data sets 920a-920n.

Figure 9C:
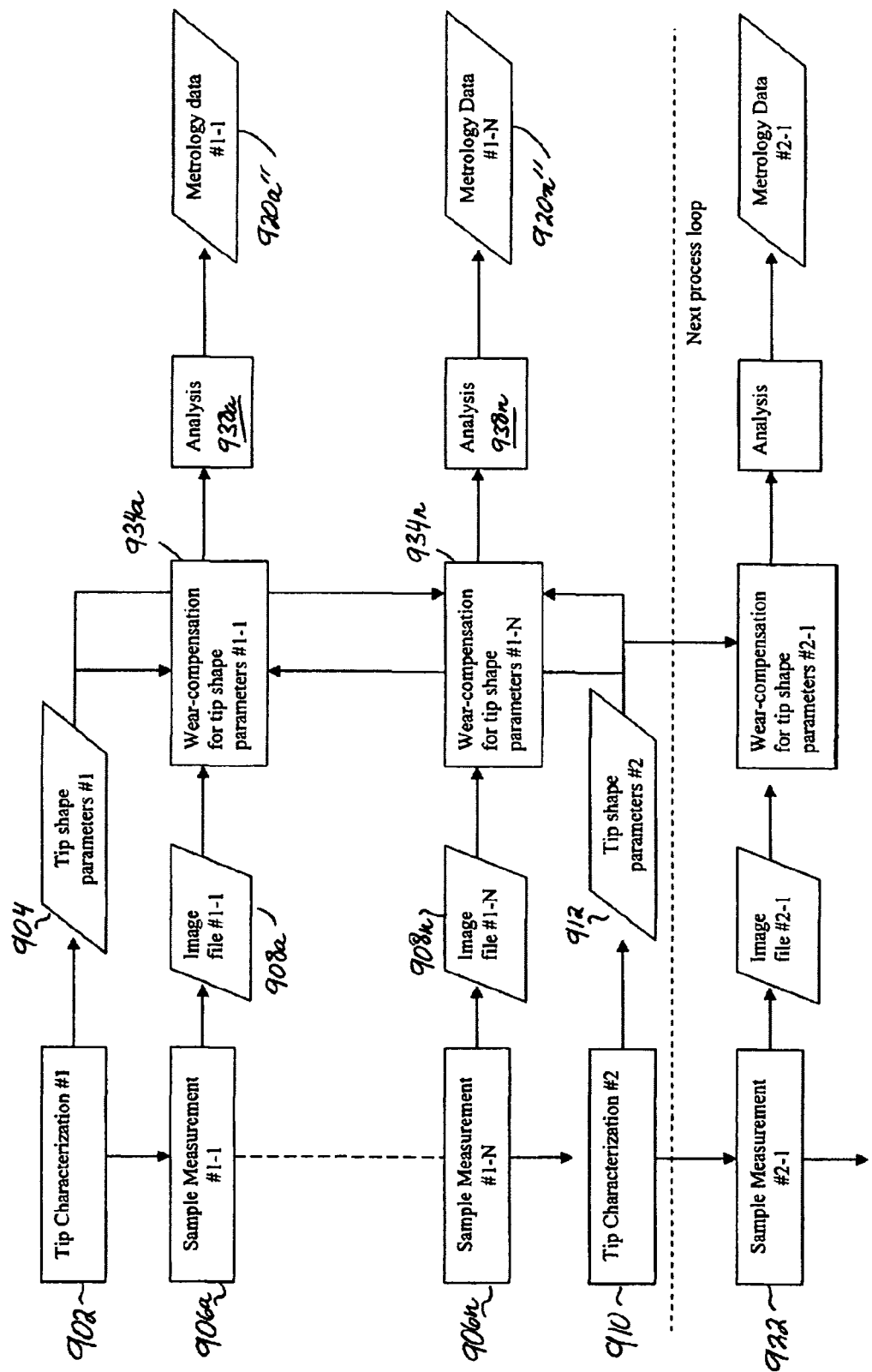

FIG. 9C is a process flow diagram illustrating another type of variation on the process of FIG. 9A. In the process of FIG. 9C, probe wear compensation steps 934a-934n are applied respectively to adjust each of image files 908a-908n, including image file 908a corresponding to the first sample measurement 906a following initial tip characterization step 902. As discussed above in greater detail, this approach can be beneficial for cross-checking the probe shape inferences, and for detecting probe tip contamination. Applying analysis steps 938a-938n as illustrated produces metrology data sets 920a"-920n", which are generally equivalent to metrology data sets 920a-920n, respectively.

Figure 9D:
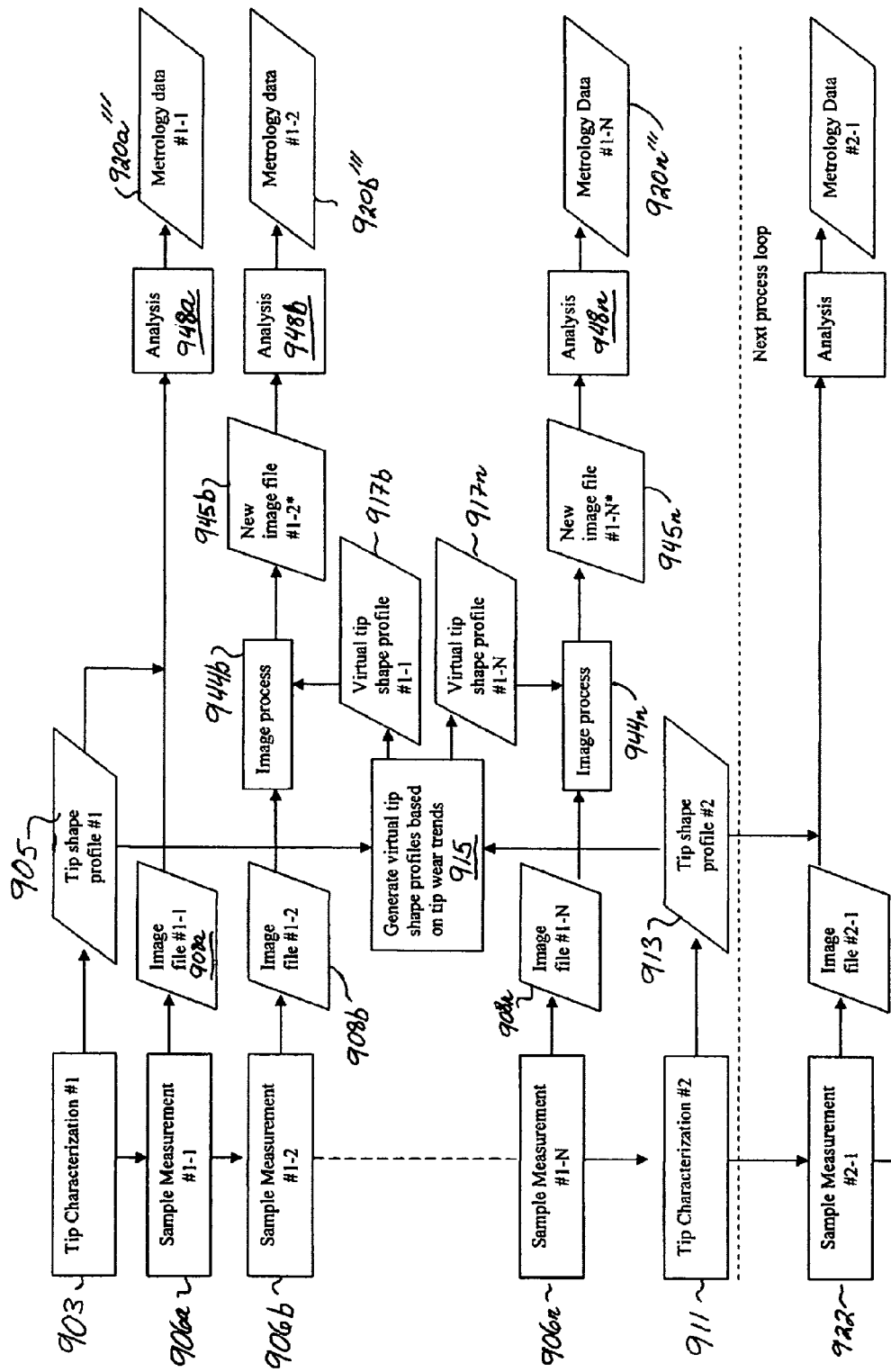

FIG. 9D is a process flow diagram illustrating an example of coordinating correction for inferred probe wear utilizing the virtual probe tip described above, to produce metrology data sets 920a'''-920n''', which are generally equivalent to metrology data sets 920a-920n, respectively. Tip characterization steps 903 and 911 respectively produce tip shape profiles 905 and 913, rather than the parametric values of the processes of FIGS. 9A-9C. Tip shape profiles 905 and 913 are synthesized and used to generate virtual tip shape profiles 917b-917n by virtual tip generation step 915. Virtual tip shape profiles 917b-917n represent the geometry of the progressively worn probe tip, and are respectively applied by image processing steps 944b-944n to reconstruct corresponding image files 908b-908n. The reconstruction produces new image files 945b-945n. Image files 908a and 945b-945n are analyzed by corresponding analysis steps 948a-948n to ultimately generate the metrology data sets 920a'''-920n'''.

In one aspect of the invention, the scheduling and carrying out of tip characterization processes is optimized in view of the availability of the above-described methods and systems for inferring probe tip wear. According to one embodiment, SPM throughput is improved by performing tip characterization processes at uneven intervals. As certain probe features become dull and begin to wear in a more linear fashion, the probe wear estimation techniques can produce more accurate inferences of probe shape. Thus, for example, actual probe characterizations may be performed prior to scanning a first site, then after scanning the $5^{th}$ site, then after scanning the $15^{th}$ site, and so on. In a related embodiment, certain tip shape parameters are characterized at different intervals from other tip shape parameters. For example, a tip shape parameter that tends to wear more slowly or more predictably, may be actually characterized in every other, or every third, characterization process, thereby reducing the time needed to carry out each probe characterization procedure.

Table 1 presents a set of experimental results of critical dimension measurements taken at different sites on a sample. Probe tip characterization was performed before the $1^{st}$ site and after the $9^{th}$ site.

about 2% of measurement. To achieve the measurement accuracy for the 9 CD measurement sites attained by this embodiment (based on performing two tip characterizations), a tip characterization must be performed at least before each site (for a total of 9 tip characterizations). To provide the same confidence in the final measurement, performing a tip characterization after the $9^{th}$ site is desirable (for a total of 10 tip characterizations).

In terms of throughput, the time to measure each site was 1.5 minutes, whereas the time for performing probe tip characterization was 3 minutes. Thus, the sample measurement ratio utilizing the conventional technique was (9*1.5)/(9*1.5+9*3)=31% for obtaining the 9 measurements with an average accuracy of less than 1 nm. The sample measurement ratio achieved by the method that produced curve 1006 was (9*1.5)/(9*1.5+6)=69%. For this example set of measurements, the total time required to perform tip characterization has demonstrably been reduced from 4.8 minutes per site to 2.2 minutes per site, which is a throughput increase by more than a factor of 2 facilitated by applying aspects of the invention.

One exemplary application for embodiments of the invention is in the measurement of nanoscale polysilicon features on wafers as part of a semiconductor production test process. In this application, a certain number of distinct sites per wafer, typically 9, 18, or 27, are measured. Each site is typically on the order of hundreds of nanometers across. At each site,

TABLE 1

Experimental Data

| | Site | | | | | | | | |
|---|---|---|---|---|---|---|---|---|---|
| | 1 | 2 | 3 | 4 | 5 | 6 | 7 | 8 | 9 |
| Target Critical Dimension (CD) | 38.248 | 40.210 | 40.460 | 40.392 | 37.879 | 39.400 | 36.454 | 39.035 | 37.261 |
| Measured CD without interpolated wear correction | 38.387 | 37.020 | 35.306 | 31.619 | 26.377 | 25.045 | 20.917 | 20.077 | 19.227 |
| Estimated CD with interpolated correction | 38.387 | 39.668 | 40.602 | 39.562 | 36.968 | 38.284 | 36.804 | 38.611 | 40.409 |
| CD Accuarcy without interpolated wear correction | 0.139 | −3.190 | −5.154 | −8.773 | −11.502 | −14.355 | −15.537 | −18.958 | −18.034 |
| CD Accuarcy with interpolated wear correction | 0.139 | 0.542 | 0.142 | 0.830 | 0.911 | 1.116 | 0.350 | 0.424 | 3.148 |

Figure 10:
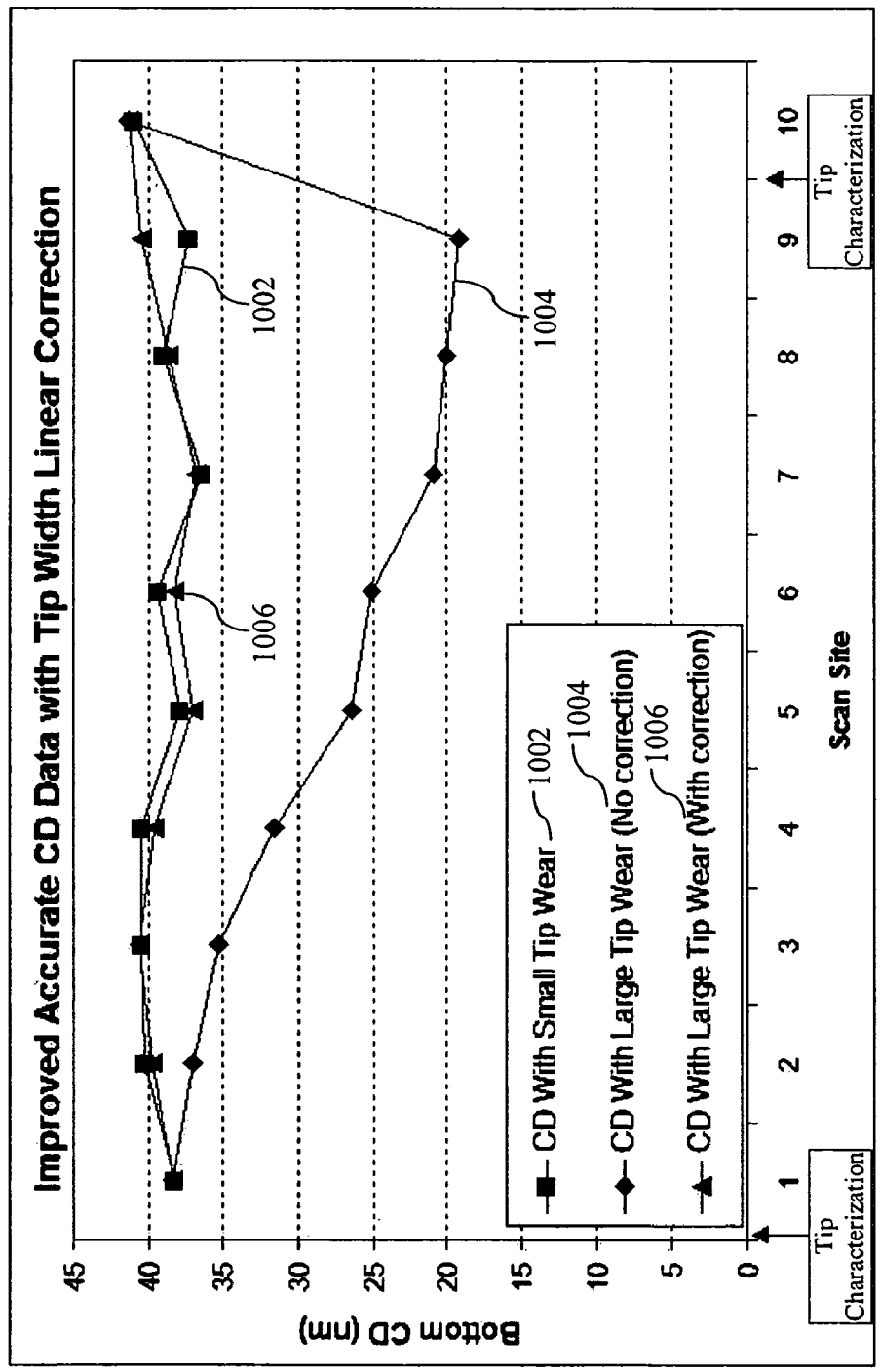
FIG. 10 is a chart presenting experimental data that demonstrates a quantitative improvement over prior techniques attained by utilizing one embodiment of the invention.

FIG. 10 illustrates the measurements of Table 1. Curve 1002 has data points taken using a CD probe having negligible tip wear, and represents the target dimension. Curve 1004 has data points taken using a CD probe having significant wear such that the total wear on the probe increases with each subsequent measurement site. Comparing the points of curves 1002 and 1004 and taking curve 1002 as the target CD measurement, the amount of wear exhibited by the probe producing the measurements of curve 1004 averaged about 2.65 nm per site, or about 7% of measurement in this case, with the measurement at site 9 being off target by about 18 nm, or 48% of measurement.

The data points of curve 1006 are measurements produced by applying a correction to the data of curve 1004 according to one embodiment of the invention. The correction was achieved by linearly interpolating a correction amount for each point based on the two tip characterization results. The points of curve 1006 are off-target by an average of 0.8 nm, or multiple critical dimension (CD) measurements are obtained for features of interest, such as a width of a line or trench at multiple locations. This generally involves CD scanning along multiple scan lines. Additional types of measurements may be obtained at multiple points at each site, such as line width variation, surface roughness, vertical slope or undercut dimension, and the like. Certain measurements at each site are statistically analyzed to produce a final measurement for that site. An accuracy such as, for example, ±1 nm, is to be met by the final measurements for each site. Applying the techniques of the various aspects of the invention enables significant throughput improvement of such a process. Taking into account the time to conduct the critical dimension scans and probe characterization, embodiments of the present invention described above can be applied to permit, for the first time, a throughput of more than 27 sites per hour while achieving an accuracy of ±1 nm.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A method for making nanoscale measurements using a scanning probe, the method comprising:
performing a plurality of probe characterizations;
substantially automatically analyzing the plurality of probe characterizations to infer a trend associated with at least one tip shape attribute of the scanning probe;
using the scanning probe to obtain data from a sample; and
utilizing the data and the trend to compute a measurement of the sample that accounts for changes to the scanning probe.

2. The method of claim 1, wherein the step of performing the plurality of scanning probe characterizations is performed on said scanning probe.

3. The method of claim 1, wherein the step of using the scanning probe to obtain data from the sample includes obtaining at least one type of data selected from the group consisting of: a surface profile, an image, a set of at least one parameter measurement, a set of at least one critical dimension measurement, or any combination thereof.

4. The method of claim 1, wherein the step of substantially automatically analyzing is used to infer a plurality of unique trends associated with a plurality of tip shape attributes.

5. A method for inspecting a nanostructure sample using a probe, the method comprising:
performing characterization of the probe;
obtaining data from a sample using the probe;
tracking probe activity; and
generating output representative of a geometry of the sample and that is based on at least the data from at least one of the nanostructure sample and a product of the step of tracking probe activity.

6. The method of claim 5 further comprising the step of estimating at least one shape attribute of the probe based on at least one of the data from the sample and the probe activity.

7. The method of claim 6, wherein the step of estimating the shape attribute of the probe includes estimating a probe wear trend.

8. The method of claim 6, wherein the step of estimating the shape attribute of the probe is based on a product of the step of performing characterization of the probe, and is further based on a product of a subsequent characterization of the probe.

9. The method of claim 6, wherein the step of estimating the shape attribute of the probe is further based on at least one item of probe information selected from the group consisting of: probe history information, intrinsic probe information, extrinsic probe information, and any combination thereof.

10. The method of claim 5, wherein the step of obtaining data from the sample Includes obtaining data from the sample at a plurality of different sites.

11. The method of claim 5, wherein the step of performing characterization of the scanning probe includes performing a plurality of nanoscale measurements of the scanning probe at different instances separated by periods of probe activity.

12. The method of claim 5, wherein the step of tracking probe activity includes at least one activity type selected from the group consisting of:
a quantity of sample sites observed by the probe;
a quantity of scan lines acquired by the probe;
a distance scanned by the probe; and
a scanning time duration of the probe.

13. A method for conducting nanoscale inspection of a sample using a scanning probe, the method comprising:
performing a at least two characterizations of the scanning probe that are separated by an interval that includes obtaining data from a plurality of points on the sample; and
utilizing at least one estimated characteristic of the scanning probe to generate corrected representations of the data such that accuracy of the inspection is substantially maintained for the plurality of points on the sample.

14. The method of claim 13, wherein the step of using the scanning probe to obtain the data from the plurality of points on the sample includes scanning a plurality of different sites of the sample.

15. The method of claim 13, wherein the step of using the scanning probe to obtain the data from the plurality of points on the sample includes scanning a plurality of features of a first site of the sample.

16. The method of claim 13, wherein the step of utilizing the at least one estimated characteristic of the scanning probe to generate the corrected representations of the data facilitates obtaining data for more points on the sample during the interval and substantially maintaining the accuracy of the inspection of these points than would otherwise be possible.

17. The method of claim 13, wherein the step of utilizing the at least one estimated characteristic of the scanning probe to generate the corrected representations of the data facilitates substantially maintaining a degree of accuracy of the inspection with a reduced quantity of characterizations of the scanning probe as compared to a quantity of characterizations of the scanning probe that would otherwise be needed for maintaining the same degree of accuracy.

18. A method of a reconstructing a representation of sample to account for wear of a probe tip used for obtaining nanoscale measurements of the sample, the method comprising:
performing a first and a second characterization of the probe tip;
using the probe tip to obtain measurements for a plurality of sites on the sample in between the first and the second characterization of the probe tip; and
for each of the plurality of sites:
creating at least one inferred shape attribute of the probe tip based on the first and the second characterizations of the probe tip; and
correcting at least one of the measurements associated with that site based on the at least one inferred shape attribute of the probe tip to account for wear of the probe tip.

19. The method of claim 18, wherein the step of correcting the at least one of The measurements includes processing an image.

20. The method of claim 18, wherein the step of correcting the at least one of The measurements includes acquiring critical dimension measurements.

21. A method for inspecting a nanostructure sample using a scanning probe that experiences probe wear as a function of use, the method comprising:
performing a first characterization of the probe;
obtaining data from the sample using the probe; and
producing corrected measurements of the nanostructure based on the data, including accounting for probe wear as a function of the probe use that occurs after the first characterization of the probe and before any subsequent characterization of the probe.

22. A method for conducting inspection of a nanostructure sample using a scanning probe, the method comprising:

performing first and second probe characterizations separated by an interval of obtaining data from the sample using the scanning probe, wherein the using of the scanning probe causes wear of the probe such that a shape attribute of the probe is different immediately after the first probe characterization than immediately before the second probe characterization by an amount greater than a desired measurement accuracy of the inspection; and substantially maintaining the desired measurement accuracy of the inspection for the interval without performing any further probe characterization.

23. A method for inspecting a nanostructure sample using a scanning probe in a production testing application, the method comprising:

performing characterization of the scanning probe; and obtaining data from the sample at a plurality of sites using the scanning probe to produce, for each site, at least one critical dimension measurement representative of that site, wherein the method of inspecting is accomplished with a sample measurement ratio of greater than 50%.

24. The method of claim 23 wherein the step of obtaining data from the sample achieves a sample measurement ratio that is greater than 75%.

25. The method of claim 23 wherein the step of obtaining data from the sample achieves a sample measurement ratio that is greater than 90%.

26. The method of claim 23 wherein the step of obtaining data from the sample achieves a sample measurement ratio that is greater than 95%.

27. The method of claim 23, wherein the step of obtaining data from the sample includes obtaining data from a semiconductor sample.

28. The method of claim 23, wherein the step of obtaining data from the sample includes obtaining data from a data storage sample.

29. The method of claim 23, further comprising the step of monitoring a process of manufacturing semiconductor devices.

30. The method of claim 23, further comprising the step of substantially automatically analyzing a trend in wear of the probe.

31. The method of claim 23, wherein the step of obtaining data from the sample produces a set of critical dimension measurements having an accuracy at least as good as +/−1.5 nm.

32. The method of claim 23, wherein the step of obtaining data from the sample produces a set of critical dimension measurements having an accuracy at least as good as +/−1 nm.

33. A method for inspecting a nanostructure sample using a scanning probe in a production testing application, the method comprising:

performing characterization of the scanning probe; and obtaining data from the sample at a plurality of sites using the scanning probe to produce, for each site, at least one critical dimension measurement representative of that site, wherein the method of inspecting is performed at a rate of at least 12 sites per hour.

34. The method of claim 33, wherein the inspecting is performed at a rate of at least 25 sites per hour.

35. The method of claim 33, wherein the step of obtaining data from the sample produces a set of critical dimension measurements having an accuracy at least as good as +/−1.5 nm.

36. The method of claim 33, further comprising the step of substantially automatically analyzing a trend in wear of the probe.

* * * * *